(12) United States Patent
Fingal et al.

(10) Patent No.: US 8,906,816 B2
(45) Date of Patent: Dec. 9, 2014

(54) LAMINATE HAVING IMPROVED WIPING PROPERTIES AND A METHOD FOR PRODUCING THE LAMINATE

(75) Inventors: Lars Fingal, Gothenburg (SE); Mikael Strandqvist, Lindome (SE)

(73) Assignee: SCA Hygiene Products AB, Gothenburg (SE)

(*) Notice: Subject to any disclaimer, the term of this patent is extended or adjusted under 35 U.S.C. 154(b) by 899 days.

(21) Appl. No.: 12/676,219

(22) PCT Filed: Sep. 3, 2007

(86) PCT No.: PCT/SE2007/050611
§ 371 (c)(1),
(2), (4) Date: Mar. 3, 2010

(87) PCT Pub. No.: WO2009/031951
PCT Pub. Date: Mar. 12, 2009

(65) Prior Publication Data
US 2010/0203306 A1 Aug. 12, 2010

(51) Int. Cl.
| | |
|---|---|
| B32B 5/26 | (2006.01) |
| B32B 5/12 | (2006.01) |
| D04H 1/46 | (2012.01) |
| B32B 5/08 | (2006.01) |
| B32B 9/02 | (2006.01) |
| B32B 27/36 | (2006.01) |
| B32B 7/12 | (2006.01) |
| B32B 27/02 | (2006.01) |
| B32B 27/34 | (2006.01) |
| B32B 27/32 | (2006.01) |
| B32B 5/14 | (2006.01) |
| A47L 13/17 | (2006.01) |
| B32B 27/12 | (2006.01) |

(52) U.S. Cl.
CPC . *A47L 13/17* (2013.01); *B32B 5/08* (2013.01); *B32B 9/02* (2013.01); *B32B 27/36* (2013.01); *B32B 7/12* (2013.01); *B32B 27/02* (2013.01); *B32B 5/26* (2013.01); *B32B 27/34* (2013.01); *B32B 27/32* (2013.01); *B32B 5/14* (2013.01); *B32B 27/12* (2013.01)
USPC ........... 442/385; 442/381; 442/387; 442/392; 442/408

(58) Field of Classification Search
CPC .............. B32B 5/26; B32B 5/12; B32B 5/06; B32B 5/08; B32B 5/022; B32B 2262/14; B32B 2250/03; B32B 2260/023; B32B 2250/20; D04H 1/42; D04H 1/465; D04H 1/492; D04H 1/46
USPC .................... 442/381, 385, 387, 392, 408, 50
See application file for complete search history.

(56) References Cited

U.S. PATENT DOCUMENTS

| 4,808,467 A | 2/1989 | Suskind et al. |
| 4,837,078 A | 6/1989 | Harrington |

(Continued)

FOREIGN PATENT DOCUMENTS

| CN | 1351485 A | 5/2002 |
| JP | 2002325698 | 11/2002 |

(Continued)

OTHER PUBLICATIONS

Translation of Chinese Office Action regarding Application No. 200780100485.X, dated Oct. 8, 2011.

(Continued)

*Primary Examiner* — Jenna Johnson
(74) *Attorney, Agent, or Firm* — Drinker Biddle & Reath LLP

(57) ABSTRACT

A sheet of wiping material has a first outer surface and a second outer surface and a core region between the surfaces. The wiping material includes absorbent fibers and non-absorbent fibers. The wiping material has a stratified structure with a fiber gradient and a higher ratio of absorbent fibers to non-absorbent fibers at the outer surfaces of the wiping material than in the core region. A method of producing the wiping material is described.

16 Claims, 2 Drawing Sheets

(56) References Cited

U.S. PATENT DOCUMENTS

| | | | |
|---|---|---|---|
| 5,382,400 A | 1/1995 | Pike et al. | |
| 5,874,159 A * | 2/1999 | Cruise et al. | 428/198 |
| 6,013,349 A | 1/2000 | Takeuchi et al. | |
| 6,573,204 B1 | 6/2003 | Philipp et al. | |
| 2004/0048542 A1* | 3/2004 | Thomaschefsky et al. | 442/389 |
| 2005/0148262 A1 | 7/2005 | Varona et al. | |
| 2005/0148264 A1* | 7/2005 | Varona et al. | 442/382 |
| 2007/0202766 A1 | 8/2007 | Ouellette et al. | |

FOREIGN PATENT DOCUMENTS

| | | |
|---|---|---|
| JP | 2004016559 | 1/2004 |
| JP | 2006-223454 A | 8/2006 |
| RU | 2222652 C2 | 1/2004 |
| WO | WO-00/38565 | 7/2000 |
| WO | 00/71067 A1 | 11/2000 |
| WO | 0179599 | 10/2001 |
| WO | 0236339 | 5/2002 |
| WO | WO-2004-022832 A1 | 3/2004 |
| WO | WO-2004/047606 | 6/2004 |
| WO | WO-2005-059218 A1 | 6/2005 |

OTHER PUBLICATIONS

International Search Report dated May 16, 2008, in PCT application.
European Search Report, dated Feb. 28, 2011, in EP07794216.
Bang One Lee et al., "Characteristics of PP/PET Biocomponent Melt Blown Nonwovens as Sound Absorbing Material," Advanced Materials Research, vols. 123-125, 2010, pp. 935-938.

* cited by examiner

LAMINATE HAVING IMPROVED WIPING PROPERTIES AND A METHOD FOR PRODUCING THE LAMINATE

TECHNICAL FIELD

The invention pertains to a sheet of wiping material having a first outer surface and a second outer surface and a core region between the surfaces, the wiping material comprising absorbent fibres and non-absorbent fibres. The invention also concerns a method for producing such wiping materials and a wipe made from the material.

BACKGROUND

There are many types of wet wipes or wipes intended for wet wiping available on the market. Such wipes include baby wipes, make-up removal wipes, wet toilet paper and wipes for other cleaning purposes. With a wet wipe is meant a wipe that is delivered to the user in a pre-moist state, usually in a sealed package containing one or more wipes. Such wipes are discarded after a single use. Other wipes are delivered in a dry state but are soaked in liquid before being used for wiping.

A commonly used substrate for wet wipes and wipes for wet wiping is a hydroentangled nonwoven material which is chosen for being softer, stronger and more textile-like than alternative materials such as airlaid and wet laid nonwovens. A standard hydroentangled material is a blend of 70/30 percent by weight of viscose and polyester but other materials have been used such as cellulose pulp/polyester blends or pure cotton fibres.

A problem with the existing wipes is that in order to be economical in use and provide adequate wiping for a long period of time, they have to have a high initial load of liquid. However, this makes them soaking wet and leads to an excessively high release of liquid in the initial wiping phase and quickly decreasing wiping performance as the liquid content decreases and the wipe becomes depleted of liquid. Moreover, the very wet wipes are unpleasant to touch and handle and it is not uncommon that liquid is inadvertently pressed or squeezed out of the wipe at a higher rate than desired, particularly in the initial phase of the wiping operation. Due to the uneven distribution of wiping liquid over the wiped surface, the existing wipes often provide an unsatisfactory wiping result. In addition, the wipes have to be reloaded with liquid or replaced with a fresh wet wipe more frequently than desired.

Hence, there exists a need for an improved wipe for wet wiping. Moreover, there exists a need for a method for producing such a wiping material.

Accordingly, it is an object of the invention to provide a wet wipe or a wipe for wet wiping exhibiting a more uniform release of liquid over time than previously known wipes. It is also an object of the invention to provide a wet wipe or a wipe for wet wiping that can provide a satisfactory wiping result during a longer time period than the previously known wipes. Moreover, it is an object of the invention to provide a simple and efficient method for producing the improved wipe.

DISCLOSURE OF INVENTION

In accordance with the invention there is provided a sheet of wiping material having a first outer surface and a second outer surface and a core region between the surfaces, the wiping material comprising absorbent fibres and non-absorbent fibres. The wiping material is characterised in that it has a fibre gradient with a higher ratio of absorbent fibres to non-absorbent fibres at the outer surfaces of the wiping material than in the core region.

The wiping material in accordance with the invention will preferably have a stratified structure with surface regions being rich in absorbent fibres and a core region being rich in non-absorbent fibres.

When the wiping material according to the invention is soaked in a liquid, the liquid will primarily be contained in the core region of the material. The core region preferably has a high bulk with large pores that can accommodate the liquid but that will readily release liquid when the wiping material is being used. The core region is predominantly made of non-absorbent fibres such as polymeric fibres. Suitable polymeric fibres are mono- bi- or multi-component fibres of polyolefins, polyesters or polyamides. Such fibres are inherently hydrophobic but are preferably treated in any conventional way such as by surfactants to be wettable in order to more readily accept the wiping liquid. Other useful non-absorbent fibres include lyocell fibres.

The outer surfaces of the wiping material are rich in absorbent fibres such as cellulosic pulp fibres, cotton fibres, flax, hemp, viscose etc. Cellulosic pulp fibres are particularly preferred since they have a lower degree of swelling as compared to, for instance, viscose fibres. This means that less liquid can be inadvertently squeezed out from the wipe. Moreover, when compared to other natural fibres or viscose fibres, the short, almost particulate pulp fibres create a denser layer with smaller pores and capillaries at the outer surfaces of the wiping material. Such a layer forms a barrier to unrestricted liquid flow since the liquid is forced to penetrate the small pores in the layer before it can escape from the material.

Hence, the absorbent fibres act as a retardation means slowing down liquid transport out of the core region. The retardation effect is due both to the absorbent properties of the fibres and to the fact that the fibres create a network of smaller pores and capillaries in a surface region of the wiping material. In this manner, the wiping material according to the invention will release liquid from the surface at a substantially uniform rate during wiping. The absorbent fibres at the surface of the wiping material will absorb and retain liquid and be wet to the touch, but not so much so as too make the wipe unpleasant to touch or handle. Furthermore, the capillary network formed by the absorbent fibres will release liquid at an even rate and will act as a buffer for liquid being squeezed out of the core region.

The sheet of wiping material preferably comprises a coherent composite material that has been formed by mechanical entanglement of the absorbent fibres and the non-absorbent fibres. By mechanical entangling, such as by needling or hydroentangling, the non-absorbent fibres form a reinforcing fibre matrix increasing the tensile strength of the wiping material and entrapping the absorbent fibres resulting in reduced linting.

The web of absorbent fibres and non-absorbent fibres is preferably hydroentangled. The wiping material may comprise two composite hydroentangled layers having a two-sided appearance with absorbent fibres concentrated on one side and non-absorbent fibres concentrated on the opposite side. The two composite hydroentangled layers are arranged with the substantially non-absorbent sides facing each other and together forming the core region of the wiping material. The hydroentangling process can be controlled so that the hydroentangled material exhibits a distinct two-sidedness.

Hydroentangling is a conventional bonding method that involves laying down fibres as a web comprising one or more layers that can be previously bonded or non-bonded on a forming screen and subjecting the compound web to water jets that move and entangle the fibres. The degree of hydroentangling can be controlled to achieve the desired effect of creating a stabilising fibrous network without negatively affecting the three-dimensional pore structure and bulk of the initial web and also to move fibres so as to obtain a desired fibre and pore size gradient. A high degree of entangling results in a more integrated material with less distinct strata and less two-sidedness. Accordingly, it is important to adjust the amount of hydroentangling in order to achieve a balance between two-sidedness and integrity of the material.

The composite layers may be bonded together by means of adhesive such as a hot melt adhesive applied at a low coating rate, preferably as low as 1-2 g/m$^2$. In order to achieve high production speeds, slot-nozzle coating is preferred. However, other bonding methods such as adhesive spraying, hydroentangling, needling, thermobonding, through-air bonding or ultrasonic bonding may be used in alternative or as a complement.

The wiping material according to the invention preferably has a pore size gradient with a smaller average pore size at the outer surfaces than in the core region. In this manner, the core region has a relatively higher bulk and large liquid containing capacity and the outer surfaces have a relatively lower bulk and high liquid retaining capacity and will transfer liquid in a controlled and uniform manner to an object that is being wiped. The pore size gradient will also contribute to slowing down liquid transfer from the core region to the outer surfaces due to the fact that liquid transport in the small pores in the absorbent outer surface regions is mainly driven by capillary forces. It is also advantageous to use non-absorbent fibres that are wet-resilient so that the bulk of the core region is retained even when the wiping material is wet. Although the pore size gradient may be linear, it is preferably non-linear implying that there is a relatively rapid change in the average pore size at the boundaries between the surface regions having smaller pores and the core region having larger pores.

The wiping material may comprise 60-90% by weight of absorbent fibres, preferably 65-70% by weight of absorbent fibres and 10-40% by weight of non-absorbent fibres, preferably 30-35% by weight of non-absorbent fibres. The absorbent fibres are preferably cellulose pulp fibres or comprise a major proportion of cellulose pulp fibres and the non-absorbent fibres may comprise a blend of endless synthetic filaments and staple fibres.

The sheet of wiping material may have a basis weight of from 50-300 g/m$^2$, preferably from 70-200 g/m$^2$ and most preferably about 100 g/m$^2$.

The non-absorbent fibres may comprise a mixture of staple fibres and endless filaments. The endless filaments provide tensile strength, porosity and bulk to the wiping material. The staple fibres form a stabilising network for the absorbent fibres and the bulk-building endless filaments and provide the wiping material with high integrity and low linting. The fibres may be mono-, bi-, or multi-component fibres of polyolefins such as polypropylene or polyethylene or other polymers such as polyesters or polyamides. Other non-absorbent fibres such as lyocell fibres may also be used.

The staple fibres may be in the range of 1-3.5 dtex. The endless filaments preferably have a greater fibre coarseness than the staple fibres.

To further reinforce the wiping material, the core region may comprise a scrim such as a plastic net.

The sheet of wiping material may be impregnated with a functional additive such as a lotion, a cleaning agent, a perfume, or the like. Furthermore, the sheet of wiping material may be a wet wipe and may contain a liquid.

The sheet of wiping material according to the invention and comprising absorbent fibres and non-absorbent fibres may be produced by a method comprising the following steps:
  forming a first layer of non-absorbent fibres;
  forming a second layer comprising absorbent fibres on the first layer;
  subjecting the combined first and second layers to hydroentangling to form a two-sided composite layer with a higher proportion of absorbent fibres on one side and a higher proportion of non-absorbent fibres on the other side;
  forming a laminate by bonding a first two-sided composite layer to a second two-sided composite layer with the sides of the composite layers having a higher proportion of non-absorbent fibres facing each other and the sides of the composite layers having a higher proportion of absorbent fibres forming a first and a second outer surface on the laminate.

The first layer of non-absorbent fibres may be a layer of endless synthetic filaments. The layer of endless synthetic filaments may be non-bonded or may be a layer of spunbond material, with non-bonded filaments being preferred. Alternatively, the first layer of non-absorbent fibres may be a carded bonded or non-bonded web.

The second layer comprising absorbent fibres preferably comprises a mixture of absorbent fibres and staple fibres, the absorbent fibres preferably being cellulose pulp fibres. When subjected to hydroentangling, the staple fibres in the web are moved by the water jets in the z-direction, i.e. in the thickness direction of the web so that a three-dimensional fibrous network is created to bond and contain the absorbent fibres.

The first and the second composite layers can be bonded by means of an adhesive, the adhesive preferably being a hot melt thermoplastic adhesive that is applied in an amount of from 1-2 g/m$^2$ by any conventional means such as by slot-coating, spraying, printing, etc. It is also conceivable to use other binding methods such as hydroentangling, needling, thermobonding, through-air bonding or ultrasonic bonding either alternatively or as additional bonding means. Heat induced bonding requires that at least some component in the material is thermoplastic.

In order to further increase tensile strength of the wiping material, a reinforcing scrim or reinforcing fibres may applied between the first and second composite layers.

The laminate may be impregnated with a liquid and/or an active agent. Impregnation may be by any suitable method such as by soaking, spraying coating, printing, etc.

BRIEF DESCRIPTION OF DRAWINGS

The invention will in the following be described in greater detail with reference to the appended drawings, wherein.

EMBODIMENTS OF THE INVENTION

Figure 1:
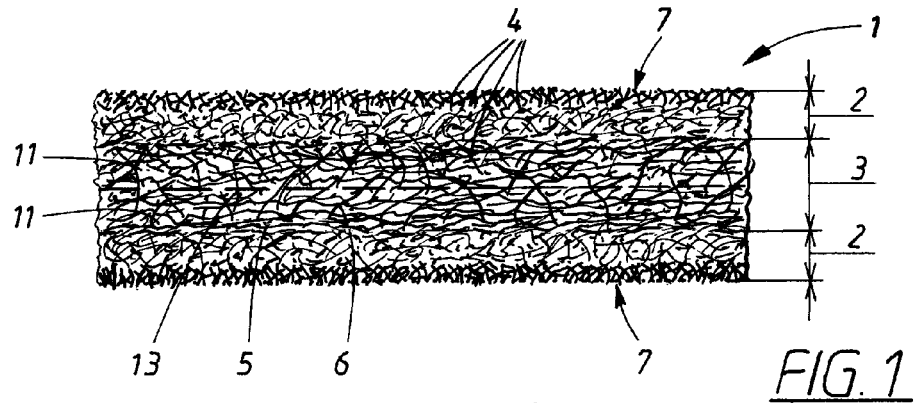
FIG. 1 shows, a side view of a wiping material in accordance with the invention.

The wiping material 1 in FIG. 1 is a layered or stratified fibrous structure having surface regions 2 and a core region 3.

The surface regions are rich in absorbent fibres 4, such as cellulosic pulp fibres, viscose, hemp, flax, cotton, or similar, with cellulosic pulp fibres being particularly preferred. Cellulosic pulp fibres are very short fibres, with fibre lengths varying from around 3 mm for softwood fibres and around 1.2 mm for hardwood fibres, and even shorter, for recycled fibres. The absorbent fibres may be a combination or mixture of fibres, such as cellulosic pulp fibres and other longer absorbent fibres. However, the absorbent fibres are preferably predominantly cellulosic pulp fibres since pulp fibres have properties that make the superior for creating a good fluid-distributing capillary network in the surface regions 2 of the wiping material. The core region 3 is rich in non-absorbent fibres 5,6. Suitable non-absorbent fibres are synthetic polymeric fibres such as mono-, bi- or multicomponent fibres of polyolefins (polyethylene, polypropylene), polyesters or polyamides.

The core region 3 has a fibrous structure with relatively large pores with high liquid containing capability. Due to the porous structure, the core region 3 will act as a liquid reservoir that will contain and gradually release liquid as the wiping material is being used for wiping. The surface regions 2 have smaller creating capillaries that will act as a retarding means for liquid transport out from the core region 3. Hence, in the surface regions 2 liquid will mainly be moved by capillary action which means that the surface regions constitute a barrier against liquid running or being squeezed out of the core region by mistake. In addition, the slow transport of liquid out through the surface regions 2, will ensure that liquid is delivered to a wiped surface at a substantially uniform rate until the wiping material is depleted of liquid and needs to be replaced or re-loaded with new liquid.

Due to the slow-release action of the wiping material according to the invention, each wipe can be used to wipe a larger surface than was previously possible for a wipe having a corresponding liquid loading capacity. The wiping result is also better with the wiping material according to the invention than with previously available wiping materials since the amount of liquid delivered to the wiped surface is substantially constant over time with no initial liquid gushes or gradually decreasing liquid transfer rate.

In order to render the non-absorbent fibrous structure wettable, the fibres are preferably treated with a surfactant, as is common in the art. Other means of making the fibrous structure hydrophilic are also conceivable, such as by subjecting the structure to plasma- or corona treatment.

The fibrous wiping material in accordance with the invention has a stratified appearance, as illustrated in FIG. 1. However, the strata do not have clear boundaries but fibres from the outer strata intermingle with fibres from internal strata in the material so that a fibre gradient is present in the wiping material. The material contains at least two distinctly different types of fibres, one type being absorbent fibres and the other type being non-absorbent fibres. The absorbent fibres are preferably at least predominantly pulp fibres and the non-absorbent fibres may be endless filaments or preferably a combination of endless filaments and network-forming staple fibres. The absorbent fibres are concentrated at the surfaces 7 of the wiping material with a proportion of absorbent fibres at the surfaces 7 approaching 100% by weight and with a gradually diminishing proportion of absorbent fibres in a direction from the surfaces 7 into the core region 3 providing the wiping material with a fibre gradient. The fibre gradient may be a linear gradient but is preferably non-linear, such that the concentration of absorbent fibres changes rapidly in the transitional areas between the surface regions 2 and the core region 3. A step-wise fibre gradient gives the wiping material a structure with more distinct layers or strata with different fibre compositions.

The wiping material in accordance with the invention may be formed in a process involving forming first and second composite layers that are bonded to each other to create a laminate wiping material as shown in FIG. 1.

Figure 2:
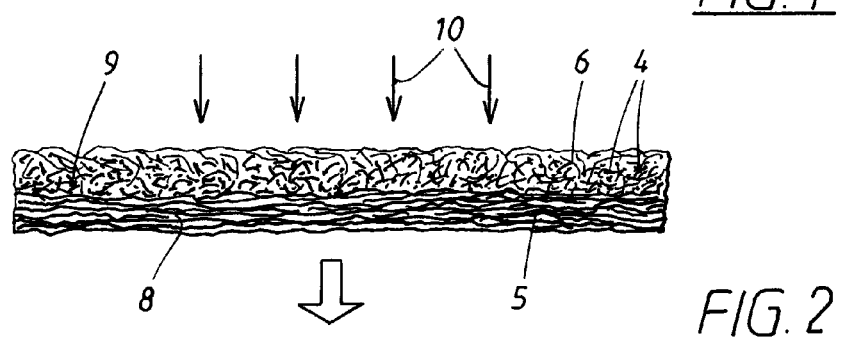
FIG. 2 shows, a fibre web for the production of a wiping material in accordance with the invention.

The process involves forming a first layer or base web 8 of non-absorbent fibres 5 and then depositing a second layer 9 comprising absorbent fibres 4 on top of the first layer 8 and subsequently binding the two layers 8,9 together by hydroentangling with water jets 10, as shown in FIG. 2. The hydroentangling process moves and entangles the fibres 4,5,6 and causes the absorbent fibres 4 to accumulate on one side, forming a distinctly two-sided composite layer 11 with a higher proportion of absorbent fibres 4 at one surface 7 and a higher proportion of non-absorbent fibres 5,6 on the opposite surface 12, as shown in FIG. 3.

Figure 3:
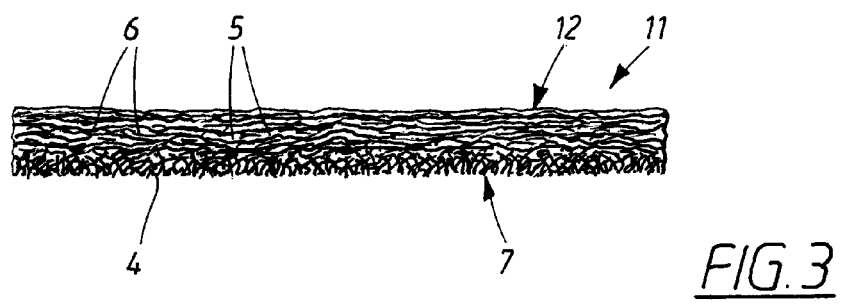
FIG. 3 shows a hydroentangled fibrous composite for the production of a wiping material in accordance with the invention.

Two of the hydroentangled composites 11 as shown in FIG. 3 are then combined into a wiping material in accordance with the invention. The two composites are bonded to each other with the sides of the composite layers having a higher proportion of non-absorbent fibres 5,6 facing each other and the sides of the composite layers 11 having a higher proportion of absorbent fibres 4 forming a first and a second outer surface 7 on the laminate wiping material web 1 as shown in FIG. 1.

Bonding of the first and the second composite layers 11 can be effected by means of an adhesive 13, as shown in FIG. 1, the adhesive preferably being a coating of hot melt thermoplastic adhesive that is applied between the composite layers 11 in an amount of from 1-2 g/m². The adhesive may be applied by any conventional means such as by slot-coating, spraying, printing, etc. It is also conceivable to use other binding methods such as hydroentangling, needling, thermobonding, through-air bonding or ultrasonic bonding either alternatively or to achieve additional bonding.

The base web or first layer 8 of non-absorbent fibres is preferably a bulky non-bonded layer of endless synthetic filaments or staple fibres. However, it is alternatively possible to use base webs in the form of bonded nonwovens, such as bonded carded webs or spunbond webs.

In order to mechanically bind short absorbent fibres and keep them from escaping from the wiping material, the non-absorbent fibres preferably comprise both staple fibres and a base web preferably in the form of a bulky web of endless filaments. In the production process, the staple fibres are laid down on the base web together with the absorbent fibres. The proportions between the absorbent fibres and the non-absorbent fibres in the web is preferably 60-90% by weight and more preferably 65-70% by weight of absorbent fibres and 10-40% by weight and more preferably 30-35% by weight of non-absorbent fibres. The amount of staple fibres in the web should preferably not exceed 20% by weight of the web and is more preferably 5-10% by weight of the web.

After entangling, the staple fibres form a three-dimensional network that stabilises the bulk of the base web and entraps and binds the absorbent fibres in the composite. Suitable staple fibres are 1-3.5 dtex polypropylene fibres. However, as previously disclosed, other fibres or mixtures of fibres may alternatively be used. The base web is preferably formed from fibres having a larger diameter than the matrix-forming staple fibres and also preferably being resilient in order to create a shape-retaining structure having large pores.

Each of the fibrous composite layers 11 preferably has a basis weight of from wherein the sheet of wiping material has a basis weight of from 25-150 g/m², preferably from 35-100 g/m² and most preferably about 50 g/m², implying that a wiping material consisting of two layers of the entangled composite has a basis weight of from 50-300 g/m², preferably from 70-200 g/m² and most preferably about 100 g/m², disregarding any contribution from binders or additional components such as active agents and reinforcing elements.

When forming the composite layers 11 of absorbent and non-absorbent fibres, the second layer comprising absorbent fibres can be a mixture of absorbent fibres such as cellulose pulp fibres and staple fibres. Alternatively, the absorbent fibres and the staple fibres can be laid down onto the base layer 8 as separate layers.

The wiping material in accordance with the invention can additionally comprise a reinforcing element such as a reinforcing scrim which is applied between the first and second composite layers 1. The reinforcing scrim can be a plastic netting, a perforated plastic film a thin nonwoven web or similar.

Figure 4:
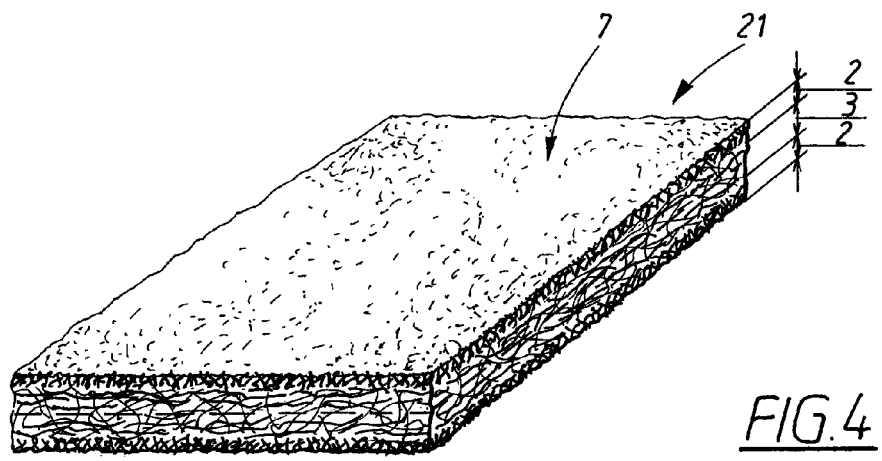
FIG. 4 shows a wipe formed from the wiping material in accordance with the invention.

The wiping material is intended to be formed into wipes for wet wiping purposes. A wipe 21 in the form of a rectangular piece of the wiping material is shown in FIG. 4. However, the wipe in accordance with the invention can have any suitable shape such as circular, oval, square, etc. The wiping material can further be perforated, embossed, provided with a printed pattern, or may have any combination of such features.

As previously set out, a wipe for use in wet wiping of an object surface can either be delivered to the user in a dry state whereupon the user has to wet the wipe before use or the wipe can be pre-moistened with a liquid. In the first instant, the wipe can be repeatedly used until it is deemed to be too dirty or too frayed after which it can be substituted by a new wipe. A pre-moistened wipe is normally discarded when the liquid in the wipe has been used up or when it has served its wiping purpose. Both kinds of wipes may be treated or impregnated by active agents such as lotions, perfumes, washing agents or the like. The active agents can be added to the wipe by soaking in a solution containing the agent, by spraying, coating, printing or by any other suitable means.

Figure 5:
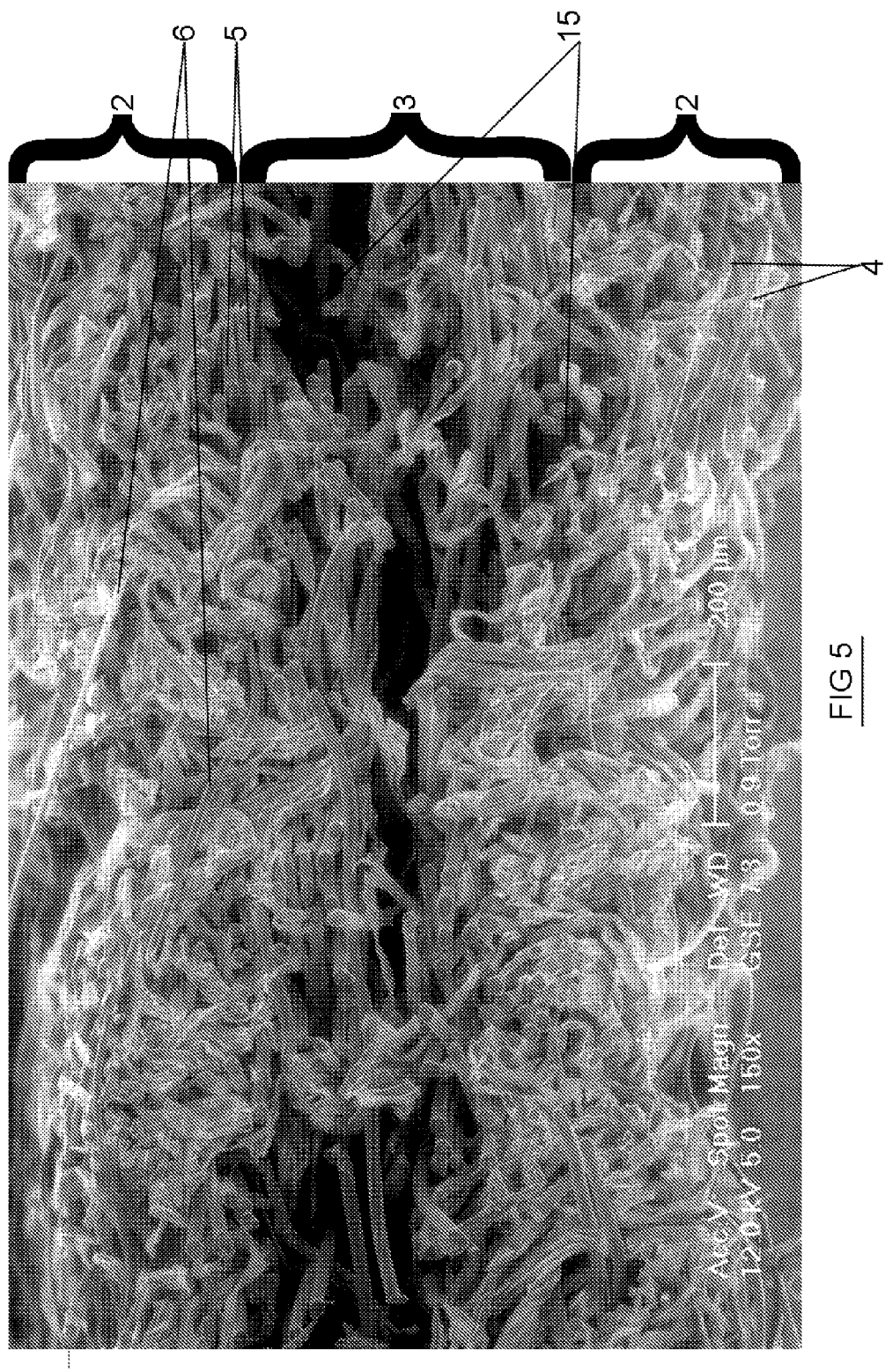
FIG. 5 shows an ESEM (Environmental Scanning Electrone Microscope) image of the fibrous structure of the wiping material in accordance with the invention.

FIG. 5 is an ESEM image showing the fibrous structure of a wiping material in accordance with the invention. The picture shows the material having internal liquid-holding voids or large pores 15 formed between non-absorbent endless filaments 5 and non-absorbent staple fibres 6 in the central core region 3 of the wiping material. The non-absorbent fibres are of two kinds; the non-absorbent network-forming staple fibres 6 and the reinforcing endless filaments 5. The non-absorbent fibres and filaments are recognised by their circular cross-section and smooth outer surface. The staple fibres 6 have a smaller diameter than the endless filaments 5. The absorbent fibres 4 are cellulose pulp fibres with a very irregular surface structure and cross-sectional area and can be seen to be accumulated in the dense regions 2 at the outer surfaces of the wiping material.

The invention claimed is:

1. A sheet of wiping material having a first outer surface and a second outer surface and a core region between the surfaces, the wiping material comprising:

absorbent fibres; and
non-absorbent fibres,
wherein the absorbent fibres and non-absorbent fibres are mechanically entangled so that the wiping material has a fibre gradient with a higher ratio of absorbent fibres to non-absorbent fibres at the outer surfaces of the wiping material than in the core region, and the wiping material has a larger liquid containing capacity in the core region than at the outer surfaces,
wherein the wiping material has a pore size gradient with a smaller average pore size at the outer surfaces than in the core region, and
wherein the absorbent fibres and non-absorbent fibres are hydroentangled.

2. The sheet of wiping material according to claim 1, wherein the absorbent fibres are cellulose pulp fibres.

3. The sheet of wiping material according to claim 2, wherein the absorbent fibres and non-absorbent fibres are hydroentangled.

4. The sheet of wiping material according to claim 1, wherein the pore-size gradient is non-linear.

5. The sheet of wiping material according to claim 1, wherein the wiping material comprises 60-90% by weight of absorbent fibres, and 1.0-40% by weight of non-absorbent fibres.

6. The sheet of wiping material according to claim 1, wherein the sheet of wiping material has a basis weight of from 50-300 g/m2.

7. The sheet of wiping material according to claim 1, wherein the non-absorbent fibres comprise a mixture of staple fibres and endless filaments.

8. The sheet of wiping material according to claim 7, wherein the staple fibres comprise 1-3.5 dtex fibres.

9. The sheet of wiping material according to claim 7, wherein the endless fibres are coarser than the staple fibres.

10. The sheet of wiping material according to claim 1, wherein the core region comprises a reinforcing scrim.

11. The sheet of wiping material according to claim 1, wherein the core region is impregnated with a functional additive, the functional additive is selected from the group consisting essentially of a lotion, a cleaning agent, and a perfume.

12. The sheet of wiping material according to claim 1, wherein the wiping material contains a liquid.

13. The sheet of wiping material according to claim 1, wherein the wiping material comprises 65-70% by weight of absorbent fibres, and 30-35% by weight of non-absorbent fibres, and the sheet of wiping material has a basis weight of from 70-200 g/m2.

14. A wipe comprising the wiping material of claim 1.

15. The sheet of wiping material according to claim 7, wherein the staple fibres form less than 20% of the non-absorbent fibres.

16. The sheet of wiping material according to claim 1, wherein the core region is configured to be impregnated by a functional additive.

* * * * *